Jan. 31, 1933. G. A. ROALFE 1,895,771
CLASSIFYING AND SEPARATING MACHINE
Filed Oct. 23, 1929
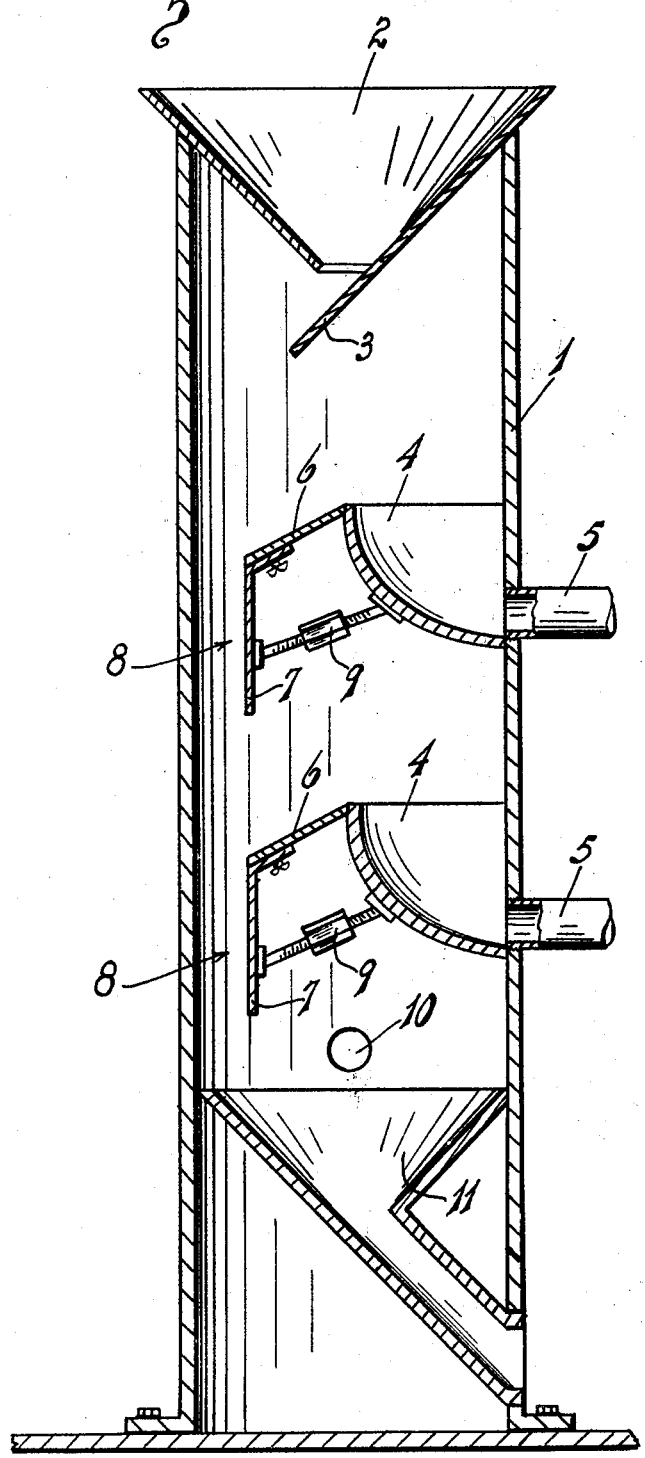
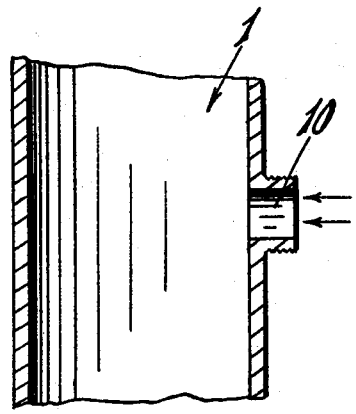
INVENTOR
GEORGE A. ROALFE
BY
ATTORNEY.

Patented Jan. 31, 1933

1,895,771

UNITED STATES PATENT OFFICE

GEORGE A. ROALFE, OF LONG BEACH, CALIFORNIA, ASSIGNOR TO ISABEL D. ROALFE, OF LOS ANGELES, CALIFORNIA

CLASSIFYING AND SEPARATING MACHINE

Application filed October 23, 1929. Serial No. 401,710.

This invention relates to a classifying and separating machine for substances which are different in specific gravity or shape of the individual particles or both.

An object of my invention is to provide a novel appliance for the separation of various substances by means of a rising column of air, and a falling column of the substances. The rising column of air being restricted at intervals by orifices.

A further object is to provide a device of the character stated in which the orifices may be adjusted.

Still another object is to provide a novel classifying and separating machine in which a very delicate and complete separation of the materials is accomplished by means of the side recovery.

Another object is to provide a classifying and separating machine in which a portion of the air is withdrawn with the material recovered at the side outlets in the tower.

Other objects, advantages and features of invention may appear from the accompanying drawing, the subjoined detailed description and the appended claims.

In the drawing:

Figure 1 is a longitudinal sectional view of my classifying and separating machine.

Figure 2 is a fragmentary sectional view taken through the air intake.

Referring more particularly to the drawing, the numeral 1 indicates a vertical tower which may be rectangular or circular in cross-section. A feed hopper 2 is provided at the top of the tower 1 for the purpose of feeding the mixed substances into the tower. A lip 3 extends at an angle from the bottom of the hopper 2 for the purpose of deflecting the fed material to one side of the tower for a purpose to be further described.

A plurality of catch basins 4 are provided at one side of the tower 1 and a pipe 5 extends from each of the basins to a suitable collecting element not shown. A portion of the air also passes out of the pipe 5 and blows the material into the collector. Obviously the basins 4 may be either entirely within, or on the outside of the tower 1. A plate 6 extends from the upper edge of each of the basins 4 to substantially the opposite wall of the tower 1. A vertically extending baffle 7 depends from the plate 6 thus forming an orifice 8 between the wall of the tower and the baffle 7. The baffle 7 is adjustable horizontally by means of a turnbuckle 9, or other suitable appliance. By adjusting the baffle 7 the size of the orifice 8 is varied and consequently the velocity of air through the orifices is changed and this has a material effect in the separation or concentration of the materials as will be further described.

An air intake 10 is provided in the tower 1 below the lowermost basin 4 and air is forced through this intake from a fan or other suitable appliance (not shown). A collecting cone 11 is provided at the bottom of the tower 1 below the intake 10 and all of the substances or substance which is not collected or separated in the basins 4 falls into the cone and is drawn off as one of the products.

The purpose of the lip 3, as previously stated, is to deflect the incoming material into the rising column of air from the orifices 8. The lip also prevents the material from falling directly into the uppermost basin 4. The basins 4 and orifices 8 are superposed so that the collection can be made from one side of the tower.

In operation, the air passes through the orifices and swirls and expands above the orifices thus casting one of the substances (a fractional product) into a basin 4 and thence through the pipe 5. This lateral movement of the air removes from the main stream of falling or suspended material that fraction for which adjustment has been made. The velocity of the air is naturally greater closer to the bottom of the tower and usually the materials of lighter specific gravity will be collected in the top and graduated as they move downwardly in the tower although adjustment of the orifices may vary this condition. By regulating the feed, the amount of air, and the size of the orifices 8, each of basins 4 will recover a given size and weight of material or product. I have also found that careful adjustment will enable me to separate substances of close specific gravity but the individual particles of which vary in form or physical character. It is obvious that the orifices may lie adjacent to one or more sides, or be entirely surrounded by a catch basin. The shape of the catch basins may also vary to suit practical conditions.

Having described my invention, I claim:

1. A tower, feed means at the top of the tower, a plurality of catch basins arranged in superposed relation in the tower, outlet pipes extending from each basin through which fractional air and products are discharged, a substantially vertically extending baffle adjacent each of the basins, said baffles forming an orifice with the walls of the tower, an air intake adjacent the lower end of the tower, the air from the intake passing through the orifices in decreasing volume, and collecting means at the bottom of the tower.

2. A tower, feed means at the top of the tower, a plurality of catch basins arranged in superposed relation in the tower, outlet pipes extending from each basin through which fractional air and products are discharged, a substantially vertically extending baffle adjacent each of the basins, said baffles forming an orifice with the walls of the tower, an air intake adjacent the lower end of the tower, the air from the intake passing through the orifices in decreasing volume, and collecting means at the bottom of the tower, and means to adjust said baffles whereby the size of the orifices is varied.

3. A tower, feed means at the top of the tower, a plurality of catch basins arranged in superposed relation in the tower, outlet pipes extending from each basin through which fractional air and products are discharged, a substantially vertically extending baffle adjacent each of the basins, said baffles forming an orifice with the walls of the tower, an air intake adjacent the lower end of the tower, the air from the intake passing through the orifices in decreasing volume, and collecting means at the bottom of the tower, and means to adjust said baffles whereby the size of the orifices is varied, deflection plates extending from the basins to the vertically extending baffle.

4. A classifying and separating machine comprising a tower, feed means at the top of the tower, a plurality of catch basins on one side of the tower, said catch basins being arranged in superposed relation, a discharge pipe extending from each of the catch basins through which a fractional product and air is discharged, a plate extending inwardly from each of the basins, a depending baffle extending from each of the plates, said baffle forming an orifice with the wall of the tower, an air intake adjacent the bottom of the tower, and collecting means at the bottom of the tower.

5. A classifying and separating machine comprising a tower, feed means at the top of the tower, a plurality of catch basins on one side of the tower, said catch basins being arranged in superposed relation, a discharge pipe extending from each of the catch basins through which a fractional product and air is discharged, a plate extending inwardly from each of the basins, a depending baffle extending from each of the plates, said baffle forming an orifice with the wall of the tower, an air intake adjacent the bottom of the tower, and collecting means at the bottom of the tower, and means to adjust said baffle plates whereby the size of the orifices is regulated.

In testimony whereof, I affix my signature.

GEORGE A. ROALFE.